Patented Nov. 20, 1923.

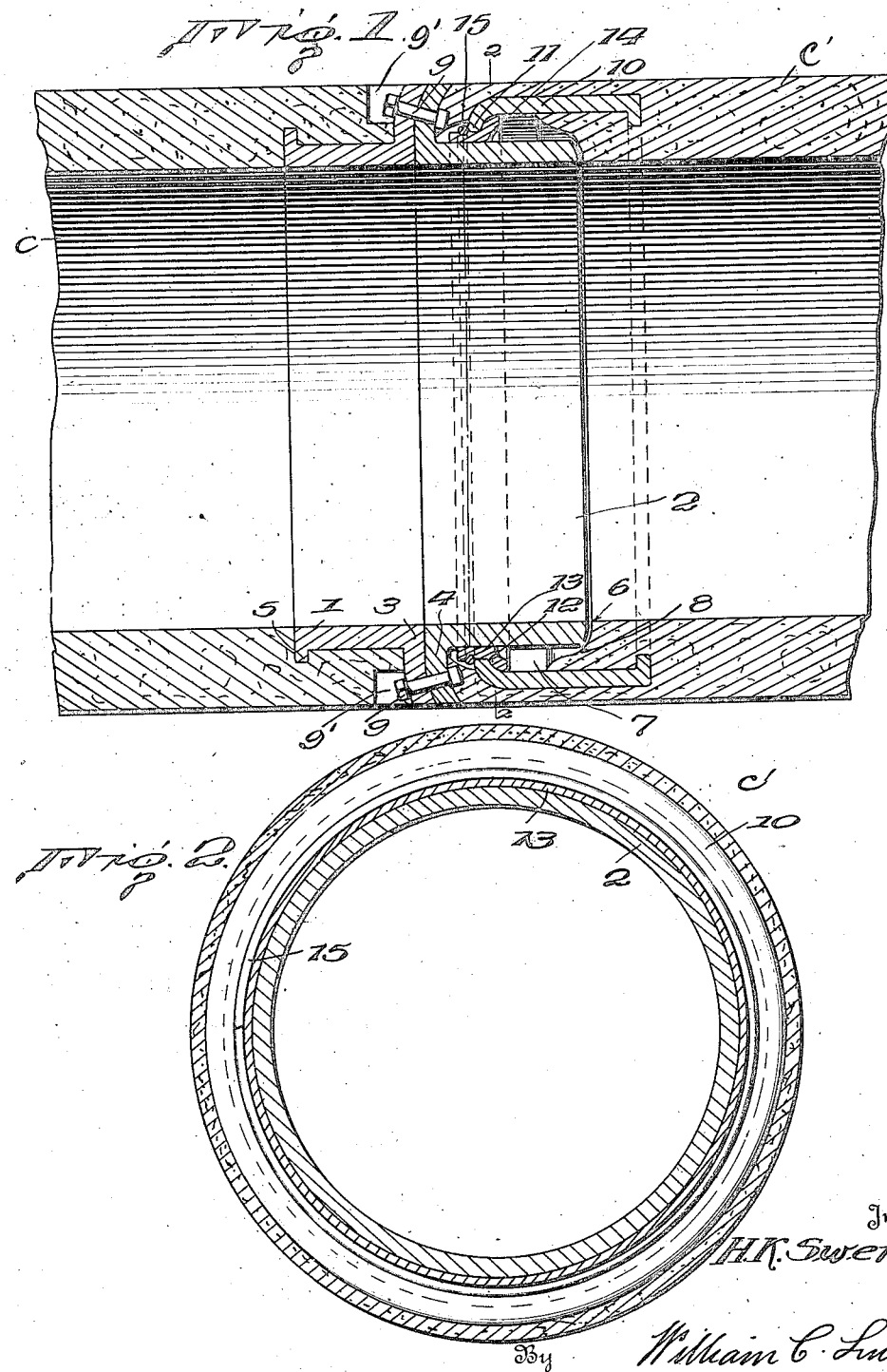

1,475,150

UNITED STATES PATENT OFFICE.

HARRY K. SWENEY, OF DENVER, COLORADO.

CONDUIT COUPLING.

Application filed June 10, 1921. Serial No. 476,628.

*To all whom it may concern:*

Be it known that I, HARRY K. SWENEY, a citizen of the United States of America, residing at Denver, in the county of Denver and State of Colorado, have invented certain new and useful Improvements in Conduit Couplings; and I do hereby declare that the following is a full, clear, and exact description of the invention, such as will enable others skilled in the art to which it appertains to make and use the same.

This invention relates to improvements in conduit connections or couplings, having for an object to provide an adjustable connecting device for flumes, mains, siphons and other types of conduits, of such construction as will compensate for any reasonable inequalities or variations of the natural earth foundation or ditches on or in which the conduit is placed, allowing limited deflection or relative movement between the connected sections of the conduit upon the chance occurrence of any inequalities or variations in its foundation without detracting from the durability or rigidity of the joints in any way.

The nature of my invention may be more fully understood, by directing attention to the fact that considerable difficulty is experienced with the now prevalent forms of connections or couplings used at the present time for joining sections of conduits, such difficulties being mainly attributable to the unstability of the terrain foundation of the conduit. Frequently, the earth is moved away from the conduit adjacent its point of connection of the sections thereof, as by being washed away, by leakage, freshets, natural seepage and various other often encountered reasons, thus leaving the connected or coupled sections of the conduit unsupported. With such conditions present, the jointed unsupported sections of the conduit are permitted to sag and ultimately, with the continued application of pressure or stress thereon, the same will leak badly or will be completely ruptured. By the use of my improved connection, the above noted difficulties are entirely eliminated, since, the joint is capable of inherent adjustment and therefore, will allow of free relative movement between the conduit sections for a distance sufficient to enable the same to adjust themselves to the varied or changed foundation therefor without the danger of detracting from the practicability of the joint.

Other objects of the invention will be in part obvious and in part pointed out hereinafter.

In order that the invention and its mode of operation may be readily understood by persons skilled in the art, I have in the accompanying illustrative drawings and in the detailed following description based thereon, set out one practical embodiment of the same.

In these drawings:

Fig. 1 is a longitudinal section through a conduit whose sections are coupled by my invention; and Fig. 2 is a transverse section taken therethrough on the line 2—2 of Figure 1.

Having more particular reference to the drawings, in connection with which like characters of reference will designate corresponding parts throughout the several views, it is to be understood that my improved conduit coupling may be equally well used upon various forms of conduits, such for instance, as conduits which are constructed or composed of concrete, wood, iron or various other materials.

The invention comprehends a pair of circular collars 1 and 2, having laterally extending inter-engageable flanges 3 and 4 formed on their adjacent ends, while the collar 1 has an anchoring flange 5 formed on its opposite marginal portion adapted to afford means for rendering connection between it and the adjacent portions of the conduit section "*c*" positive. The opposite marginal portion of the flange 2 is preferably formed with a curved bearing surface 6, the purpose of which will be hereinafter apparent, and this collar 2 is received in an internal pocket or recess 7 formed in that portion of its conduit "*c'*" receiving the same, as clearly shown in the figure 1, the rear walls of said recess 7 being curved as at 8 to correspond to the curving at 6 of the collar 2, whereby said collar will be permitted to have transverse or what may be aptly termed radial adjustment with respect to its conduit section "*c'*".

Bolts 9 are passed through the lateral flanges 3 and 4 of the collars 1 and 2 and obviously, afford means for rigidly interconnecting these collars.

In order that connection will be effected between the collar 2 and its conduit section "c'" whereby to permit of limited movement between the same and yet prevent such material longitudinal movement of the collar with relation to the conduit section as would cause its displacement, an anchoring element in form of a metal annulus 10 is imbedded in the adjacent portion of the conduit section "c'" and has an inwardly extending lateral flange 11 formed on its free end, the marginal portions of which are rounded as at 12. In this connection, it is to be noted that the annulus 10 extends to a point in proximity to that end of the conduit section "c'" abutting the adjacent side of the flange 4 of said collar 2, although it is faced inwardly from said flange 4 to permit engagement of the rounded portion 12 of the flange 11 with a retaining ring 13 having a peripherally disposed rib or abutment 14 formed thereon and against which the inner side of said flange 11 abuts. When the flange 11 of the annulus 10 has been engaged over the retaining ring 13, a locking ring 15, circular in cross section, is driven on the outer portion of the retaining ring 13 and caused to snap into a peripherally disposed groove formed in said ring 13 for reception of the same. The locking ring 15, if desired, may be split, and hence, given such resiliency as will allow the same to expand when it is first engaged over the outer end of the retaining ring 13, and then to contract by reason of this resiliency when it is snapped into engagement with the peripherally disposed groove formed in said ring 13 therefor. As will be understood, when the locking ring 15 has been driven into its peripheral groove upon the retaining ring 13, longitudinal movement between the flange 11 of the annulus 10 and the retaining ring 13 will be prevented, but due to this ball-like connection between the inner side of the flange 11 of the annulus 10 and the abutment 14 of the retaining ring, the annulus may pivot upon the retaining ring. The collar 2 is then driven a short distance within the retaining ring 13 and it is to be here understood that this ring 13 fits snugly upon the collar 2 so that only a "driving fit" may be effected and relative movement between the collar and the retaining ring 13 is prevented unless undue force in a longitudinal direction is applied.

The section c' is also formed so as to provide the pocket 7, the curved surface 8 of which is to receive the curved inner end 6 of the collar 2 and the curved outer end of this section c' lies adjacent the curved inner surface of the flange 4 of this collar 2. The rounded end 12 of the annulus 10 is then seated in proper position upon the outer periphery of the retaining ring 13 and is locked in this position between the abutment 14 and the locking ring 15. The collar 2 is then driven a short distance within the retaining ring 13 so that its flange 4 projects from the conduit c'. The connecting ends of the sections of the conduit are then placed adjacent one another and the flanges 3 and 4 carried thereby are bolted together by means of the bolts 9. The sections of the conduit c and c' are then forced towards one another so that the rounded end of the section c' will fit within the curved face of the flange 4 and in this manner, the sections of the conduit are assembled and coupled together. Due to this driving fit between the retaining ring 13 and the collar 2, the latter is fixedly engaged by the ring 13 whereby to prevent any longitudinal or sliding movement of the ring upon the collar 2. Whereas, I have illustrated and described two conduit sections c and c' each section may have embedded in one end thereof the collar 1 and its opposite end the annulus 10 so that the material of the conduits will completely extend over the annulus and retaining ring 13, but the flange 3 of the collar 1 covers the outer face of one end of each section.

The collar 2 and its flange 4 may be an integral part of the collar 1 but to facilitate the handling of the conduit sections the collars are preferably separable. In Fig. 1 of the drawing I have illustrated pockets 9' which may also be formed within the section c adjacent the flange 3 so that access may be gained to the bolts 9 when it is desired to apply the nuts thereto and when the sections are connected together, these pockets may be filled with concrete if desired.

From the foregoing, it is to be understood that a conduit whose sections are coupled with my invention will be permitted to have relative movement as between said sections without detracting from the efficiency of the joints, since, should the earth foundation of the conduit sections at that point adjacent the coupling thereof be removed or give way, these portions of the section will be permitted relative movement and by consequence, allowed to adapt themselves to the varied or changed foundation. Relative movement between the conduit sections "c" and "c'" is permitted by reason of the loose reception of the collar 2 in the internal recess 7 of the conduit section "c'", said collar 2 being permitted to have transverse or radial movement with relation to its respective conduit sections without stretching the joint between the flanges 3 and 4 afforded by the connecting bolt 9. Due to the ball-like connection between the annulus 10 and the retaining ring 13, an effectual form of pivot is provided the collar 2 about which the same may swing to such an extent as is necessary to permit the conduit sections to adapt themselves to the changed foundation. However, such longitudinal movement of the collar 2 with respect to its particular conduit section "c'" as would detract from the efficiency of the joint will be prevented due to the engagement of the lateral or right angularly disposed flange 10 with the peripherally disposed abutment 15 on the retaining ring 13. Manifestly, the construction shown is capable of considerable modification and such modification as is within the scope of my claims, I consider within the spirit of my invention.

I claim:

1. A conduit coupling, comprising collars engageable with the adjacent ends of sections to be coupled, means for rigidly interconnecting said collars, one of these collars being movable transversely with relation to its respective section, and means for connecting said collar to its section to permit of such transverse movement of the same, but to prevent longitudinal movement of the collar with relation to said section.

2. A conduit coupling, comprising collars engageable with the adjacent ends of sections to be coupled, means for rigidly interconnecting said collars, one of these collars being received in an internal recess formed in the section therefor, and means for pivoting said last mentioned collar in its respective conduit whereby to permit of relative movement between the two but to prevent relative longitudinal movement thereof.

3. A conduit coupling, comprising collars engageable with the adjacent ends of sections to be coupled, means for rigidly interconnecting said collars, one of these collars being loosely received in an internal recess formed in its particular section, an annulus arranged in said last mentioned section having an inwardly extended rounded right angular flange formed on one end thereof, and means engaged with the adjacent collar for receiving said rounded right angular flange and affording a pivotal support for the collar with respect to its section.

4. A conduit coupling, comprising collars engageable with the adjacent ends of sections to be coupled, means for rigidly interconnecting said collars, one of these collars being loosely received in an internal recess formed in its respective section, an annulus engaged in said last mentioned section having inwardly disposed rounded flange formed on one end thereof, a retaining ring fixedly positioned on said loosely arranged collar having a peripherally disposed abutment thereon for receiving said rounded flange of the annulus, whereby to afford a pivotal support for the loosely arranged collar in said internal recess, and locking means engaged with said retaining ring for preventing longitudinal displacement of the inwardly extending rounded flange of said annulus with relation to the retaining ring.

5. A conduit coupling, comprising collars engageable with the adjacent ends of sections to be coupled, means for rigidly interconnecting said collars, one of these collars being loosely arranged in an internal recess formed in its respective section, the rear walls of which recess are curved, while the adjacent marginal portions of the flange received therein are correspondingly curved, an annulus engaged in said last mentioned section having an inwardly extending rounded flange formed on one end thereof, a retaining ring fixedly engaged with said loosely arranged collar for receiving said rounded flange thereon, and locking means engageable with the retaining ring whereby to prevent longitudinal displacement of said rounded flange with relation to the same.

6. A conduit coupling, comprising collars engageable with the adjacent ends of sections to be coupled, means for inter-connecting said collars, one of these collars being loosely received in an internal recess formed in its respective section and having its inner marginal portions rounded to correspond to the curved walls of said internal recess, and means effecting pivotal connection between said collar and said last mentioned conduit.

7. A conduit coupling, comprising a collar loosely arranged in one end of the conduit section, said end of the conduit section being formed with an internal recess having curved rear walls, the inner marginal portions of the collar being curved to correspond to said curved rear walls of the internal recess, an annulus engaged with said section having inwardly extending rounded flange formed on one end thereof, retaining means on said collar for receiving said inwardly extending rounded flange therein and permitting pivotal movement as between the same, and locking means engageable with said retaining means for preventing longitudinal displacement of said annulus with relation to the retaining means.

In witness whereof I have hereunto set my hand.

HARRY K. SWENEY.